(12) United States Patent
Jahn

(10) Patent No.: US 8,804,177 B2
(45) Date of Patent: Aug. 12, 2014

(54) VALIDATION OF BRANCHING PRINT WORKFLOWS

(71) Applicant: Janeen E. Jahn, Lafayette, CO (US)

(72) Inventor: Janeen E. Jahn, Lafayette, CO (US)

(73) Assignee: Ricoh Company, Ltd, Tokyo (JP)

( * ) Notice: Subject to any disclaimer, the term of this patent is extended or adjusted under 35 U.S.C. 154(b) by 0 days.

(21) Appl. No.: 13/712,743

(22) Filed: Dec. 12, 2012

(65) Prior Publication Data

US 2014/0160521 A1    Jun. 12, 2014

(51) Int. Cl.
G06F 3/12 (2006.01)
G06K 15/00 (2006.01)
G06Q 10/06 (2012.01)
H04N 1/387 (2006.01)

(52) U.S. Cl.
CPC ............. *G06F 3/1296* (2013.01); *G06Q 10/06* (2013.01); *H04N 1/387* (2013.01)
USPC .......... 358/1.15; 358/1.16; 358/1.18; 399/82; 399/87; 399/361

(58) Field of Classification Search
USPC ............. 358/1.11–1.18; 705/7; 709/223, 220, 709/203
See application file for complete search history.

(56) References Cited

U.S. PATENT DOCUMENTS

| | | | |
|---|---|---|---|
| 7,979,472 B2 | 7/2011 | Weinberr et al. | |
| 8,098,389 B2 | 1/2012 | Matoba et al. | |
| 8,171,117 B2* | 5/2012 | Rhodes et al. | 709/220 |
| 8,284,423 B2* | 10/2012 | Jahn et al. | 358/1.15 |
| 2005/0239328 A1* | 10/2005 | Nagata et al. | 439/582 |
| 2007/0067728 A1 | 3/2007 | Lo et al. | |
| 2009/0077164 A1* | 3/2009 | Phillips et al. | 709/203 |
| 2009/0077216 A1* | 3/2009 | Rhodes et al. | 709/223 |
| 2009/0077217 A1* | 3/2009 | McFarland et al. | 709/223 |
| 2009/0112652 A1* | 4/2009 | Kelsey et al. | 705/7 |
| 2009/0299809 A1 | 12/2009 | Dettori et al. | |
| 2012/0243028 A1* | 9/2012 | Dumitrescu et al. | 358/1.15 |
| 2013/0003119 A1* | 1/2013 | Yamaguchi | 358/1.15 |

OTHER PUBLICATIONS

Michael Stoute at al., "Workflow Management Tool Support for Incident Command Systems," 1-4244-0065-1/06/ $20.00 © 2006 IEEE.
Markus Hammori et al. "Interactive Workflow Mining," J. Desel, B. Pernici, and M. Weske (Eds.): BPM 2004, LNCS 3080, pp. 211-226, 2004. c Springer-Verlag Berlin Heidelberg 2004.

* cited by examiner

*Primary Examiner* — Satwant Singh
(74) *Attorney, Agent, or Firm* — Duft Bornsen & Fettig LLP

(57) ABSTRACT

Methods and systems disclosed provide for validating branching print workflows by segmenting the workflows into a plurality of linear sequences of steps, and validating each of the linear sequences. In one embodiment, a system receives a print workflow for a print job. The print workflow comprises steps identifying the print shop activities to perform for the print job. The system determines whether the print workflow comprises a branching workflow. If the print workflow is a branching workflow, then the system segments the branching workflow into a plurality of linear sequences of steps. The system then determines if the branching workflow is valid by analyzing each of the linear sequences based on workflow rules.

24 Claims, 5 Drawing Sheets

VALIDATION OF BRANCHING PRINT WORKFLOWS

FIELD OF THE INVENTION

The invention relates to the field of printing systems and, in particular, to print workflow validation.

BACKGROUND

Print shops are typically medium or large scale facilities capable of supplying printing services to meet a variety of customer demands. For example, print shops are often used to print documents for mass-mailing (e.g., customer bills, advertisements, etc). Because print shops engage in printing on a scale that is hard to match, their customer base is usually varied. Print shop clients may therefore include both large institutional clients (e.g., credit card companies and banks), and small clients (e.g., small businesses and churches).

Print shops are generally arranged to print incoming jobs from clients in a way that is economical, yet fast. Thus, print shops often include a number of high-volume printers capable of printing incoming jobs quickly and at high quality. These printers may be managed by operators who can remove paper jams and reload the printers with media. Print shops also typically include post-print devices that are used to process the printed documents of each job (e.g., stackers, staplers, cutters, binders, etc.). Because print shops serve a variety of clients, they are often tasked with printing jobs that have varying printing formats, delivery dates, and media requirements. Print shops therefore often use a centralized print server that coordinates the activity between printers of the print shop and clients. The print server schedules incoming jobs and forwards them to the printers they are directed to.

Customers with printing needs generate print jobs for the print shop using a variety of tools, such as web interfaces to the print shop, client side tools operated by the customer, etc. When a customer generates a job for the print shop, options for the job are selected by the customer and integrated into the print job (e.g., a job ticket for the customer's print data indicates duplexing, media types, etc.) based on the capabilities and activities that the print shop offers to customers. A print shop operator then generates a print workflow for the print job. The print workflow includes sequences of steps that identify the print shop activities to perform for the print job. Such steps may include a variety of actions such as printing, stapling, generating billing for the customer, shipping, an email verification process for proof sheets, etc.

In some cases, a print shop operator may generate a print workflow that is not valid. This may occur in cases where the particular rules of workflow generation are not followed. For example, if a print shop operator generates a print workflow that defines a binding operation prior to a printing operation, then this type of activity would not be possible. As the complexity of print workflows increase, so does the possibility of mistakes being made. Complex print workflows may include a number of conditional branches that render it difficult to determine if the print workflow as a whole is valid.

SUMMARY

Embodiments described herein provide for validating branching print workflows by segmenting the workflows into a plurality of linear sequences of steps, and validating each of the linear sequences. A branching print workflow includes at least two separate paths through the workflow. The branch may be due to a conditional step in the print workflow. By decomposing branching workflows into linear segments and performing a validation process on the linear segments, complex branching print workflows can be validated. This reduces the potential for erroneous print workflows being introduced to the print shop.

In one embodiment, a control system receives a print workflow for a print job. The print workflow comprises steps identifying the print shop activities to perform for the print job. The control system determines whether the print workflow comprises a branching print workflow. If the print workflow is a branching workflow, then the control system segments the branching workflow into a plurality of linear sequences of steps. The control system then determines if the print workflow is valid by analyzing each of the linear sequences based on workflow rules.

In another embodiment, a method comprises receiving a print workflow for a print job, where the print workflow comprises steps identifying print shop activities to perform for the print job. The method further comprises determining whether the print workflow comprises a branching print workflow. The method further comprises segmenting the print workflow into a plurality of linear sequences of steps. The method further comprises determining if the print workflow is valid by analyzing each of the linear sequences based on workflow rules.

In another embodiment, a non-transitory computer readable medium embodies programmed instructions which, when executed by a processor, direct the processor to receive a print workflow for a print job, where the print workflow comprises steps identifying print shop activities to perform for the print job. The instructions further direct the processor to determine whether the print workflow comprises a branching print workflow. The instructions further direct the processor to segment the print workflow into a plurality of linear sequences of steps. The instructions further direct the processor to determine if the print workflow is valid by analyzing each of the linear sequences based on workflow rules.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
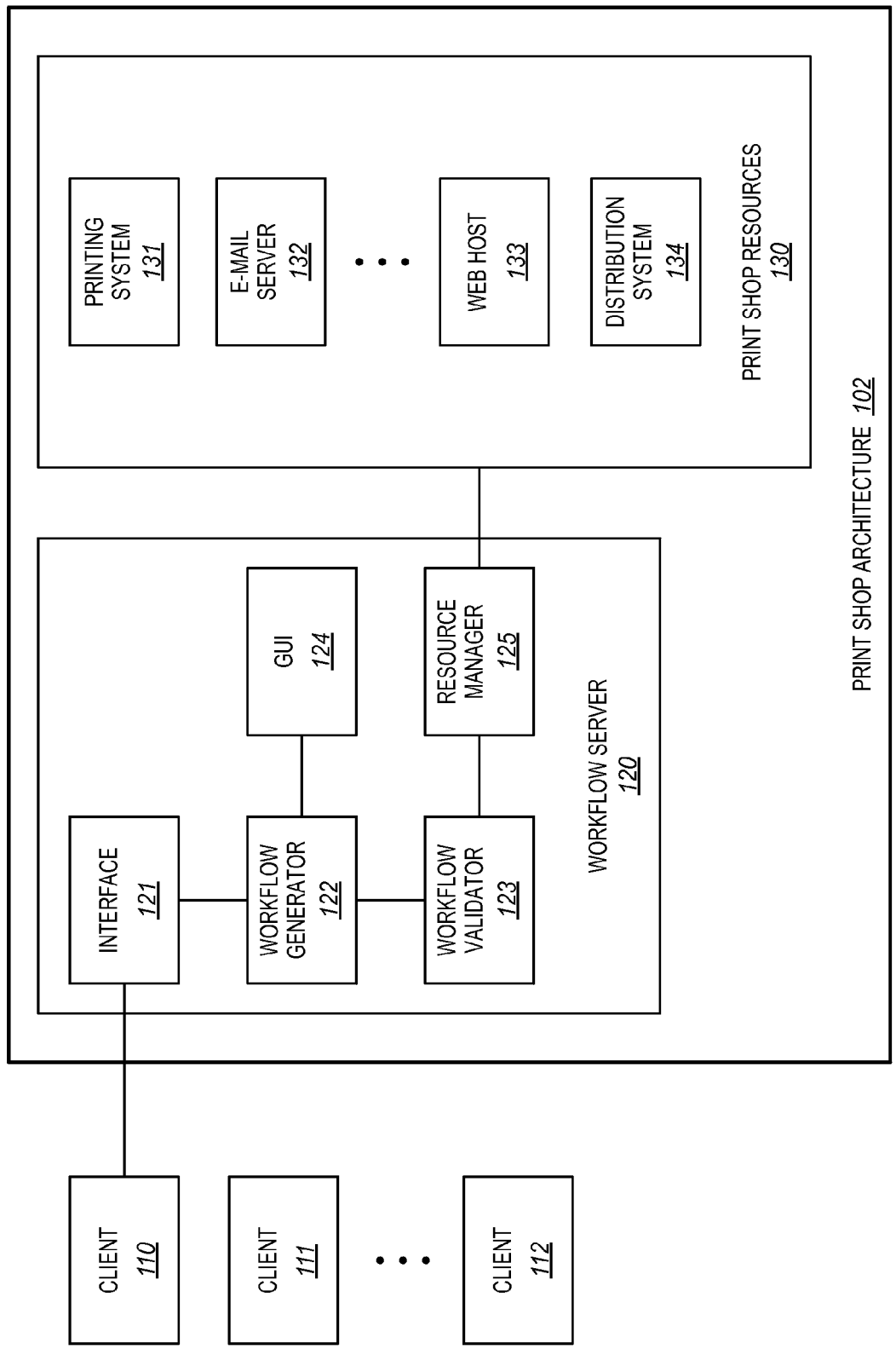
FIG. 1 is a block diagram illustrating a print shop architecture in an exemplary embodiment.

FIG. 1 is a block diagram illustrating a print shop architecture 102 in an exemplary embodiment. Print shop architecture 102 includes a workflow server 120, which functionally connects one or more clients 110-112 to print shop resources 130. Clients 110-112 may be servers or software applications used by print shop customers. Clients 110-112 submit print data and job tickets that describe how the print data will be processed to interface 121. Workflow server 120 generates workflows for incoming print jobs, performs a validation process on the workflows, and manages print shop resources 130 in accordance with these workflows. The workflows are validated based on workflow rules that define the relationships, ranges of values, instances, etc., of steps used to implement the activities that are provided by print shop resources 130.

Clients 110-112 may serve banks, credit card companies, or other customers that have printing and document delivery needs (e.g., monthly bank statements, monthly credit card bills, etc.). Clients 110-112 may also serve customers with digital printing and publishing needs (e.g., needs for e-mail services, web publishing services, and others). Information describing the activities requested by the customer may be included in job tickets sent by clients 110-112.

Print shop resources 130 include the devices and components of the print shop that are used to perform print shop activities. For example, print shop resources 130 may include personnel, printers, post-printing machinery, e-mail or web publishing servers, media, ink, firmware versions for print shop devices, etc. Print shop resources 130 may exist within the confines of the print shop itself, or may comprise off-site devices and functional components managed by workflow server 120. The print shop resources 131-134 illustrated in FIG. 1 are merely meant to provide an example of the variety of print shop resources 130 that may be provided. For instance, print shop resources 130 may include printing system 131 for transforming print data onto a suitable printable medium, such as paper. Other resources may include e-mail server 132 for generating e-mails, web host 133 for generating and hosting web pages or other internet content, and distribution system 134 for packaging and shipping printed documents.

While in operation, workflow server 120 identifies the available activities that may be performed by print shop resources 130. Workflow server 120 may determine the available print shop activities based upon the nature of print shop resources 130. For example, when print shop resources 130 include e-mail server 132, then the available activities may include generating e-mails, scheduling times to send e-mails, and selecting e-mail recipients. The activities may be associated with a category or type of resource (e.g., personnel, printers, servers) and may also be associated with specific named print shop resources (e.g., Susan, printing system 131, e-mail server 132).

Innumerable print shop activities may be available, and certain print shop activities may be logically related with each other so that they have order and dependency relationships (e.g., a post-printing activity such as hole punching depends upon the print data being successfully printed). A print shop operator may prioritize activities (e.g., to ensure that billing is the last activity performed), and may make certain activities required (e.g., billing may be required for every print job that enters the system). Furthermore, certain activities may be required, altered, or made optional based upon specific clients, customers, or information in a job ticket of the print job (e.g., customer service requests, multimedia parameters, size of the print data, format of the print data, etc.). For example, thank-you letters may be sent to high value or long-term customers, while credit checks may be performed upon new customers. The logical relationships, permissible values, configurations, the number of instances, etc., of steps for a print workflow are hereinafter referred to as "workflow rules". In addition to printing activities, workflow rules may regulate non-printing activities (e.g., billing, shipping, document review, multimedia/digital/internet activities, credit checks, etc.). In order to aid an operator of the print shop in creating a print workflow for a print job, a Graphical User Interface (GUI) 124 is provided for manipulation of print workflows.

Once the activities that are available at architecture 102 have been determined, an operator utilizes GUI 124 in conjunction with workflow generator 122 to generate a print workflow for a print job. A workflow validator 123 receives the print workflow and performs a validation process based on workflow rules. As discussed previously, creating a print workflow is sometimes prone to operator error, especially when the print workflow is complicated by conditional branches that may result in multiple possible paths through a branching print workflow. For example, a new customer may have a conditional branch in a branching workflow in order to perform a credit check on the customer prior to beginning a job for the customer. In the converse, high value customers may have a conditional branch in a branching workflow in order to mail out thank-you letters. Further, a conditional branch may occur when the number of pages exceeds a threshold, thus triggering a billing change to the customer. Or, a conditional branch may result in sending an email to a customer when the print job is missing some information used to complete the job for the customer. Further, a conditional branch may result in translating file formats prior to rendering data for the job. Such branching workflows may include multiple possible linear paths that are subject to the rules of the workflow. Further, the workflow rules may define criteria for the branching workflow as a whole that necessarily are validated on a per-path basis. For example, if the workflow rules define a limit as to how many times a particular step may occur in a workflow as a whole, then it may be necessary to analyze each of the possible linear paths through a branching workflow in order to determine that no combination of linear paths results in the particular step occurring more often than the defined limit.

In response to generating a print workflow, workflow generator 122 provides the new workflow to workflow validator 123, which will be discussed later. A workflow that is not validated may be re-submitted to workflow generator 122 for correction.

Resource manager 125 of workflow server 120 analyzes the validated workflow and directs print shop resources 130 to perform the activities defined by the workflow for a given print job. Resource manager 125 identifies activities that relate to specific print shop resources 131-134 (e.g., the activity "e-mail the client a printing status report" may relate to e-mail server 132), and instructs the specific resources to perform the identified activities. Resource manager 125 may also receive feedback from print shop resources 130 (e.g., information indicating that an activity has successfully completed).

Thus, while in operation, workflow server 120 receives and processes incoming print jobs from clients 110-112. Workflow server 120 determines the customer's service requests, and generates, under operator interaction, a workflow of activities to perform in order to achieve the requested services for the customer. Workflow server 120 validates the workflow, and then initiates processing of the workflow for each job.

Figure 2:
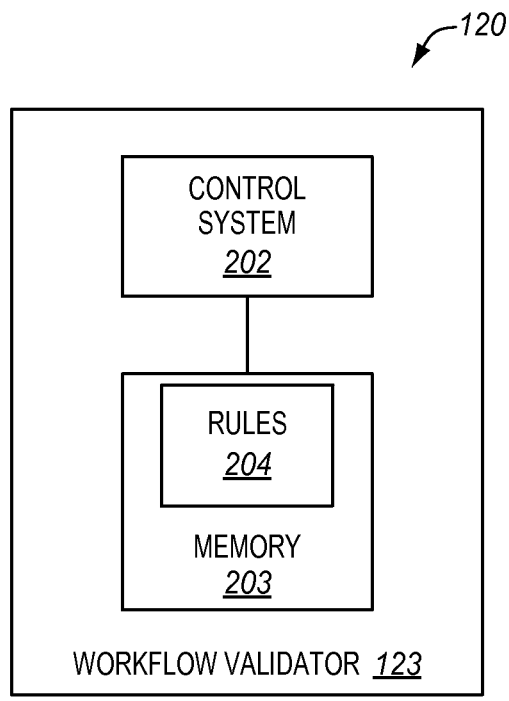
FIG. 2 is a block diagram illustrating additional details for a workflow server of the architecture of FIG. 1 in an exemplary embodiment.

FIG. 2 is a block diagram illustrating additional details for workflow validator 123 of FIG. 1 in an exemplary embodiment. In this embodiment, workflow validator 123 includes a control system 202 and a memory 203. Control system 202 comprises any device, component, or system that is operable to determine whether a branching workflow is valid. Memory 203 in this embodiment comprises any device, component, or system that is operable to store workflow rules 204. Generally, control system 202 segments branching workflows into a plurality of linear sequences of steps, and determines if the print workflow is valid by analyzing each of the linear sequences based on workflow rules 204. In this embodiment, consider that client 110 generates a print job for print shop architecture 102, and transmits the print job to interface 121 of workflow server 120. Utilizing GUI 124, a print shop operator interacts with workflow generator 122 to generate a branching workflow for the customer's job. The branching workflow in this embodiment is a collection of linear sequences of steps resulting from one or more conditional branches. After generating the branching workflow, the branching workflow is transmitted to workflow validator 123 in order to perform a validation process.

Figure 3:
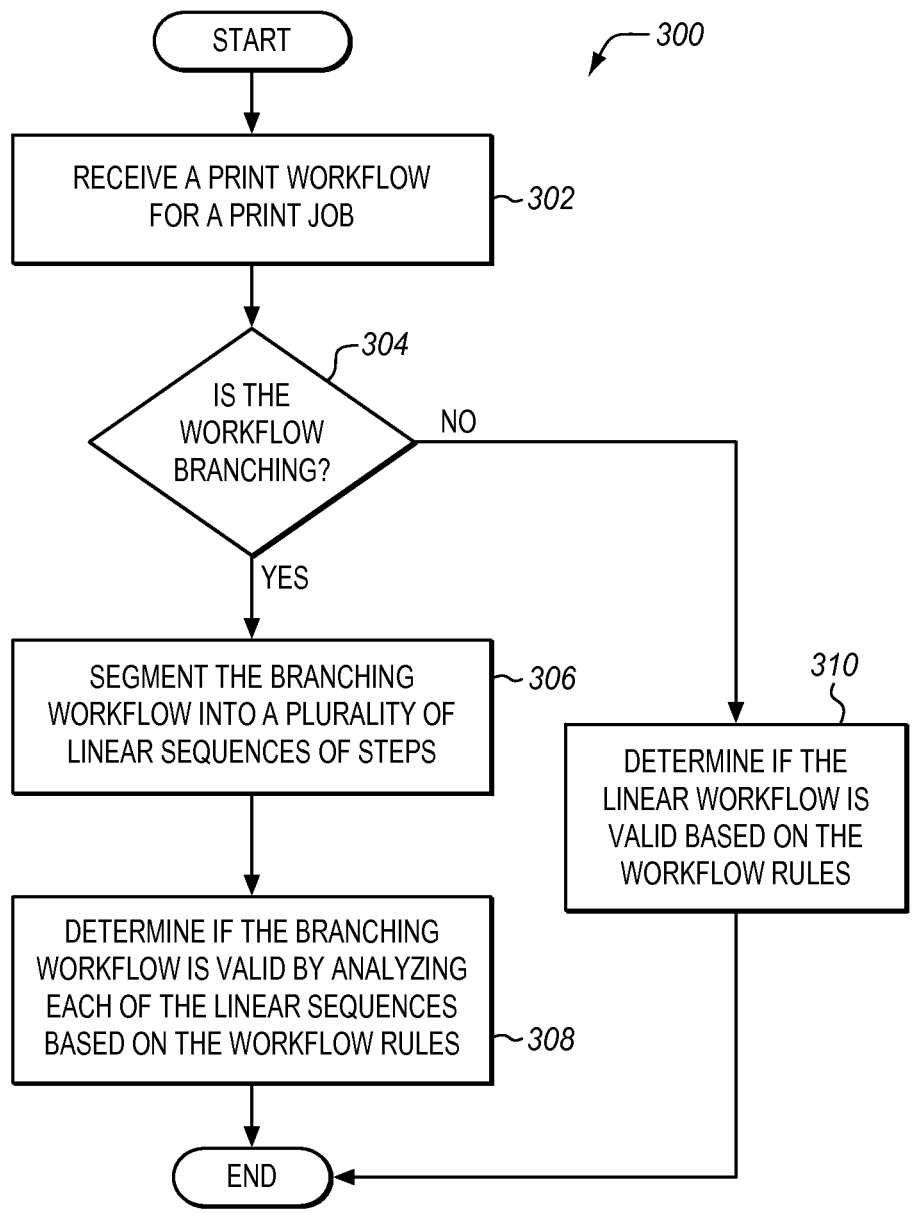
FIG. 3 is a flow chart illustrating a method of validating branching print workflows in an exemplary embodiment.

FIG. 3 is a flow chart illustrating a method 300 of validating branching print workflows in an exemplary embodiment. The steps of method 300 will be described with respect to control system 202 of FIG. 2, although one skilled in the art will understand that method 300 may be performed by other systems not shown. The steps of the method described herein are not all inclusive and may include other steps not shown. The steps may also be performed in an alternative order.

In step 302, control system 202 receives a print workflow for a print job. The print workflow includes steps that identify the print shop activities to perform for the print job. For example, the steps may indicate a preflight activity for the print job, customer credit verification, printing, post-print activity for the job (e.g., stapling, binding, mailing, shipping, etc.).

Figure 4:
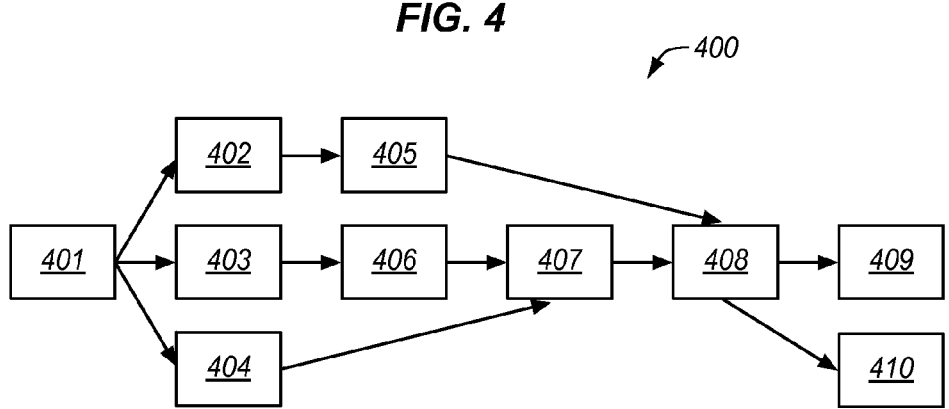
FIG. 4 is a block diagram illustrating a branching print workflow in an exemplary embodiment.

FIG. 4 is a block diagram illustrating a branching print workflow 400 in an exemplary embodiment. Workflow 400 includes a number of steps 401-410 in a specific order. Some of steps 401-410 are branching steps. Branching steps have more than one possible subsequent step. For example, after performing step 401, any or all of steps 402-404 may be performed. Further, after performing step 408, any or all of steps 409-410 may be performed. Because workflow 400 includes a number of possible linear paths, it may be that some combination of linear paths through workflow 400 renders workflow 400 invalid. Thus, prior to releasing workflow 400 to the print shop, it would be advantageous to ensure that workflow 400 is valid.

In step 304, control system 202 determines whether workflow 400 is a branching workflow. Control system 202 may analyze the steps of workflow 400 and determine that some of the steps include conditional branches. This would result in a branching workflow due to the multiple possible linear paths that may be taken through workflow 400. If workflow 400 is a branching workflow, then step 306 is performed. If workflow 400 is a linear workflow, then control system 202 determines if workflow 400 is valid in step 310.

Figure 5:
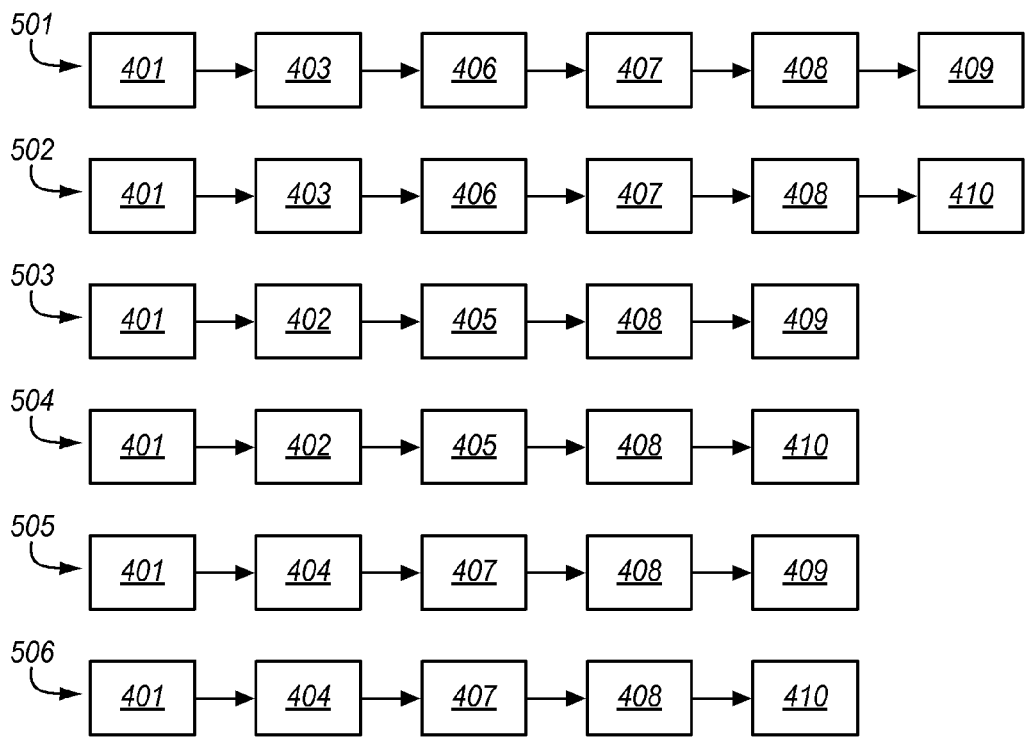
FIG. 5 is a block diagram illustrating a linear decomposition of the print workflow of FIG. 4 in an exemplary embodiment.

In step 306, control system 202 segments workflow 400 into a plurality of linear sequences of steps. When segmenting workflow 400, control system 202 may step through workflow 400 and assemble a table of possible linear sequences resulting from the paths that may be taken through workflow 400. FIG. 5 is a block diagram illustrating a linear decomposition of workflow 400 of FIG. 4 in an exemplary embodiment. FIG. 5 illustrates linear sequences of steps 501-506, resulting from the decomposition of workflow 400. In this embodiment, linear sequence 501 comprises steps 401, 403, and 406-409. Linear sequence 502 comprises steps 401, 403, 406-408, and 410. Linear sequence 503 comprises steps 401-402, 405, and 408-409. Linear sequence 504 comprises steps 401-402, 405, 408, and 410. Linear sequence 505 comprises steps 401, 404, and 407-409. Linear sequence 506 comprises steps 401, 404, 407-408, and 410.

In step 308, control system 202 determines if branching workflow 400 is valid by analyzing the linear sequences 501-506 based on workflow rules 204. For example, in some embodiments, workflow rules 204 define a phase order for print workflows. The phase order may comprise a receive phase, a prepare phase, a print phase, and a complete phase. Further, each phase may include zero or more steps. Generally, the receive phase includes receiving new jobs into the system, setting initial job attributes, etc. The prepare phase includes transforming print data to create page data, and may include print data conversion between different Page Description Language (PDL) formats. The print phase routes jobs to an eligible printer.

The complete phase marks jobs as complete and deletes expired jobs. In some embodiments, control system 202 may first determine which phase each of the steps in linear sequences 501-506 resides in, and verify that the steps transition between the phases in the correct order. For example, if step 401 falls into the prepare phase and step 402 falls into the receive phase, then workflow 501 would be invalid for failing to follow a workflow rule defining a phase order of the receive phase, prepare phase, print phase, and complete phase. In cases where workflow rules 204 define that at least one step is required in a particular phase for workflow 400 as a whole, then control system 202 may evaluate linear sequences 501-506 to determine if at least one of the linear sequences 501-506 satisfies this workflow rule. For example, if workflow rules 204 define that at least one step is present in each of the receive phase and the complete phase, then control system 202 may evaluate each of the steps in linear sequences 501-506 to determine that a step resides in each of those phases for at least one of the linear sequences 501-506.

In other cases, workflow rules 204 may define constraints with regard to a minimum number of times a step may be present in a workflow, a maximum number of times a step may be present in a workflow, etc. For example, if a binding step is present in workflow 400, then control system 200 may evaluate each of the linear sequences 501-506 to verify that the binding step is not implemented multiple times in a single linear sequence, as this would indicate that branching workflow 400 is potentially invalid for some combinations of possible linear sequences 501-506. The binding step may be present in each of the linear sequences 501-506 and would therefore appear to violate the maximum number of times it may be present. However, the maximum rule may be satisfied by considering each linear sequence individually rather than in total.

As discussed previously, complex print workflows may include a number of conditional branches that render it difficult to determine if the print workflow as a whole is valid. However, workflow validator 123 (see FIG. 1) identifies sequences of steps for each of the linear paths through a branching workflow, and determines if the branching workflow is valid by analyzing the linear paths based on the workflow rules. This ensures that all possible combination of linear paths through a branching workflow are valid, thus preventing an operator from inadvertently creating an invalid branching workflow.

Figure 6:
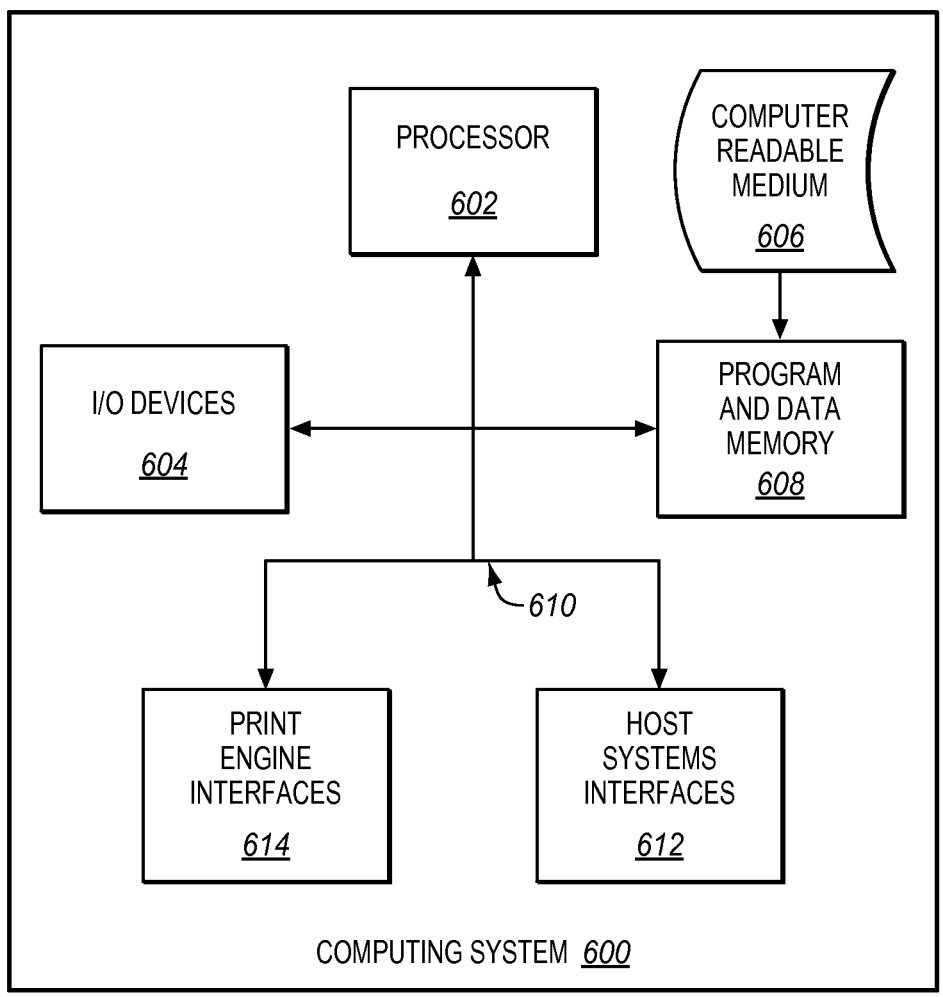
FIG. 6 is a block diagram illustrating a computer system operable to execute computer readable medium embodying programmed instructions to perform desired functions in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 600 in which a computer readable medium 606 may provide instructions for performing method 300 in an exemplary embodiment.

Furthermore, the invention can take the form of a computer program product accessible from a computer-usable or computer-readable medium 606 providing program code for use by or in connection with a computer or any instruction execution system. For the purposes of this description, a computer-usable or computer readable medium 606 can be any apparatus that can contain, store, communicate, propagate, or transport the program for use by or in connection with the instruction execution system, apparatus, or device.

The medium 606 can be an electronic, magnetic, optical, electromagnetic, infrared, or semiconductor system (or apparatus or device) or a propagation medium. Examples of a computer-readable medium 606 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution.

Input/output or I/O devices 604 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 612, or remote printers or storage devices through intervening private or public networks, such as through print engine interfaces 614. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

I claim:

1. A system comprising:
a control system operable to receive a print workflow for a print job, wherein the print workflow comprises steps identifying print shop activities to perform for the print job; and
the control system is further operable to determine whether the print workflow comprises a branching print workflow, to segment the print workflow into a plurality of linear sequences of steps, to determine a number of times a step is present in each of the linear sequences of steps, and to determine that the print workflow is valid if the number of times is equal or greater than a minimum number of times the step may be present in a print workflow as defined by workflow rules.

2. The system of claim 1 wherein:
the workflow rules define a phase order for print workflows comprising a receive phase and a complete phase; and
the control system is further operable to determine phases for steps in each of the linear sequences, and to determine that the print workflow is valid if at least one of the linear sequences includes at least one step in both the receive phase and the complete phase.

3. The system of claim 2 wherein:
the control system is further operable to determine the phase order for steps in each of the linear sequences, and to determine that the print workflow is valid if steps in each of the linear sequences conform to the phase order for print workflows defined in the workflow rules.

4. The system of claim 1 wherein:
the workflow rules define an attribute constraint for a defined step in a print workflow; and
the control system is further operable to identify the defined step in the linear sequences, and to determine that the print workflow is valid if the defined step satisfies the attribute constraint defined in the workflow rules.

5. A method comprising:
receiving a print workflow for a print job, wherein the print workflow comprises steps identifying print shop activities to perform for the print job;
determining whether the print workflow comprises a branching print workflow;
segmenting the print workflow into a plurality of linear sequences of steps;
determining a number of times a step is present in each of the linear sequences of steps; and
determining that the print workflow is valid if the number of times is equal or greater than a minimum number of times the step may be present in a print workflow as defined by print workflow rules.

6. The method of claim 5 wherein:
the workflow rules define a phase order for print workflows comprising a receive phase and a complete phase; and
determining if the print workflow is valid further comprises:
determining phases for steps in each of the linear sequences; and
determining that the print workflow is valid if at least one of the linear sequences includes at least one step in both the receive phase and the complete phase.

7. The method of claim 6 wherein:
determining that the print workflow is valid further comprises:
determining the phase order for steps in each of the linear sequences; and
determining that the print workflow is valid if steps in each of the linear sequences conform to the phase order for print workflows defined in the workflow rules.

8. The method of claim 5 wherein:
the workflow rules define an attribute constraint for a defined step in a print workflow; and determining if the print workflow is valid further comprises:
    identifying the defined step in the linear sequences; and
    determining that the print workflow is valid if the defined step satisfies the attribute constraint defined in the workflow rules.

9. A non-transitory computer readable medium embodying programmed instructions which, when executed by a processor, direct the processor to:
    receive a print workflow for a print job, wherein the print workflow comprises steps identifying print shop activities to perform for the print job;
    determine whether the print workflow comprises a branching print workflow;
    segment the print workflow into a plurality of linear sequences of steps;
    determine a number of times a step is present in each of the linear sequences of steps; and
    determine that the print workflow is valid if the number of times is equal or greater than a minimum number of times the step may be present in a print workflow as defined by print workflow rules.

10. The non-transitory medium of claim 9 wherein:
    the workflow rules define a phase order for print workflows comprising a receive phase and a complete phase; and
    instructions to determine if the print workflow is valid further comprises instructions that direct the processor to:
        determine phases for steps in each of the linear sequences; and
        determine that the print workflow is valid if at least one of the linear sequences includes at least one step in both the receive phase and the complete phase.

11. The non-transitory medium of claim 10 wherein:
    instructions to determine that the print workflow is valid further comprises instructions that direct the processor to:
        determine the phase order for steps in each of the linear sequences; and
        determine that the print workflow is valid if steps in each of the linear sequences conform to the phase order for print workflows defined in the workflow rules.

12. The non-transitory medium of claim 9 wherein:
    the workflow rules define an attribute constraint for a defined step in a print workflow; and
    instructions that determine if the print workflow is valid further comprises instructions that direct the processor to:
        identify the defined step in the linear sequences; and
        determine that the print workflow is valid if the defined step satisfies the attribute constraint defined in the workflow rules.

13. A system comprising:
    a control system operable to receive a print workflow for a print job, wherein the print workflow comprises steps identifying print shop activities to perform for the print job; and
    the control system is further operable to determine whether the print workflow comprises a branching print workflow, to segment the print workflow into a plurality of linear sequences of steps, to determine a number of times a step is present in each of the linear sequences of steps, and to determine that the print workflow is valid if the number of times is equal or greater than a maximum number of times the step may be present in a print workflow as defined by workflow rules.

14. The system of claim 13 wherein:
    the workflow rules define a phase order for print workflows comprising a receive phase and a complete phase; and
    the control system is further operable to determine phases for steps in each of the linear sequences, and to determine that the print workflow is valid if at least one of the linear sequences includes at least one step in both the receive phase and the complete phase.

15. The system of claim 14 wherein:
    the control system is further operable to determine the phase order for steps in each of the linear sequences, and to determine that the print workflow is valid if steps in each of the linear sequences conform to the phase order for print workflows defined in the workflow rules.

16. The system of claim 13 wherein:
    the workflow rules define an attribute constraint for a defined step in a print workflow; and
    the control system is further operable to identify the defined step in the linear sequences, and to determine that the print workflow is valid if the defined step satisfies the attribute constraint defined in the workflow rules.

17. A method comprising:
    receiving a print workflow for a print job, wherein the print workflow comprises steps identifying print shop activities to perform for the print job;
    determining whether the print workflow comprises a branching print workflow;
    segmenting the print workflow into a plurality of linear sequences of steps;
    determining a number of times a step is present in each of the linear sequences of steps; and
    determining that the print workflow is valid if the number of times is equal or greater than a maximum number of times the step may be present in a print workflow as defined by print workflow rules.

18. The method of claim 17 wherein:
    the workflow rules define a phase order for print workflows comprising a receive phase and a complete phase; and
    determining if the print workflow is valid further comprises:
        determining phases for steps in each of the linear sequences; and
        determining that the print workflow is valid if at least one of the linear sequences includes at least one step in both the receive phase and the complete phase.

19. The method of claim 18 wherein:
    determining that the print workflow is valid further comprises:
        determining the phase order for steps in each of the linear sequences; and
        determining that the print workflow is valid if steps in each of the linear sequences conform to the phase order for print workflows defined in the workflow rules.

20. The method of claim 17 wherein:
    the workflow rules define an attribute constraint for a defined step in a print workflow; and
    determining if the print workflow is valid further comprises:
        identifying the defined step in the linear sequences; and
        determining that the print workflow is valid if the defined step satisfies the attribute constraint defined in the workflow rules.

21. A non-transitory computer readable medium embodying programmed instructions which, when executed by a processor, direct the processor to:

receive a print workflow for a print job, wherein the print workflow comprises steps identifying print shop activities to perform for the print job;

determine whether the print workflow comprises a branching print workflow;

segment the print workflow into a plurality of linear sequences of steps;

determine a number of times a step is present in each of the linear sequences of steps; and determine that the print workflow is valid if the number of times is equal or greater than a maximum number of times the step may be present in a print workflow as defined by print workflow rules.

22. The non-transitory medium of claim 21 wherein:

the workflow rules define a phase order for print workflows comprising a receive phase and a complete phase; and instructions to determine if the print workflow is valid further comprises instructions that direct the processor to:

determine phases for steps in each of the linear sequences; and determine that the print workflow is valid if at least one of the linear sequences includes at least one step in both the receive phase and the complete phase.

23. The non-transitory medium of claim 22 wherein:

instructions to determine that the print workflow is valid further comprises instructions that direct the processor to:

determine the phase order for steps in each of the linear sequences; and determine that the print workflow is valid if steps in each of the linear sequences conform to the phase order for print workflows defined in the workflow rules.

24. The non-transitory medium of claim 21 wherein:

the workflow rules define an attribute constraint for a defined step in a print workflow; and instructions that determine if the print workflow is valid further comprises instructions that direct the processor to:

identify the defined step in the linear sequences; and determine that the print workflow is valid if the defined step satisfies the attribute constraint defined in the workflow rules.

\* \* \* \* \*